United States Patent [19]

Kim

[11] Patent Number: 5,528,305
[45] Date of Patent: Jun. 18, 1996

[54] METHOD FOR REDUCING EMPTY SIDES OF A WIDE SCREEN AND AN APPARATUS THEREOF

[75] Inventor: Jeong-hoon Kim, Kwachon, Rep. of Korea

[73] Assignee: Samsung Electronics Co., Ltd., Kyungki-do, Rep. of Korea

[21] Appl. No.: 302,311

[22] Filed: Sep. 8, 1994

[30] Foreign Application Priority Data

Sep. 8, 1993 [KR] Rep. of Korea ............ 93-18008

[51] Int. Cl.$^6$ ................. H04N 7/01; H04N 5/46
[52] U.S. Cl. ................. 348/445; 348/556
[58] Field of Search .................. 348/445, 556, 348/913, 555, 718, 449; H04N 7/01, 5/46

[56] References Cited

U.S. PATENT DOCUMENTS

| | | | |
|---|---|---|---|
| 4,730,215 | 3/1988 | Jose et al. | 348/445 |
| 5,170,256 | 12/1992 | Tabata | 348/556 |
| 5,243,421 | 9/1993 | Nagata et al. | 348/445 |
| 5,323,235 | 6/1994 | Jonomura et al. | 348/445 |
| 5,353,065 | 10/1994 | Katsumata | 348/556 |
| 5,386,236 | 1/1995 | Hong | 348/445 |
| 5,428,454 | 6/1995 | Kimura et al. | 348/445 |

*Primary Examiner*—Victor R. Kostak
*Attorney, Agent, or Firm*—Sughrue, Mion, Zinn, Macpeak & Seas

[57] ABSTRACT

An apparatus for reducing empty sides of a wide screen decreases no-signal area on the left and right sides of the wide screen by differing time compression ratio of a video signal when an NTSC video signal having an aspect ratio of 4:3 is displayed on the wide screen having an aspect ratio of 16:9. A controller sets the frequency of read clock signals supplied to a line memory which are varied with respect to each sub-section within an effective horizontal scanning section to compress the NTSC video signal in the central sub-section of the effective horizontal scanning section. By compressing the video signal, the central portion of the wide screen displays the time-compressed picture while the left and right portions displays a broader picture which is not subjected to the time compression.

16 Claims, 4 Drawing Sheets

METHOD FOR REDUCING EMPTY SIDES OF A WIDE SCREEN AND AN APPARATUS THEREOF

BACKGROUND OF THE INVENTION

The present invention relates to a system for displaying a standard NTSC video signal having an aspect ratio of 4:3 on a wide screen having an aspect ratio of 16:9, and more particularly to a method for reducing no-signal areas appearing on both sides of a wide screen by varying a time compression ratio of a video signal, and a corresponding apparatus.

Generally, an aspect ratio of the typical NTSC television is 4:3, while an aspect ratio for maximizing actual presence to a viewer is 16:9. Several methods are being proposed for displaying the standard NTSC broadcasting signal or a VTR signal of visual system transmission algorithm (VISTA) size on a television receiver having the aspect ratio of 16:9.

FIGS. 1A to 1C illustrate examples of presenting an NTSC signal having the aspect ratio of 4:3 on the television receiver of a 16:9 aspect ratio. In FIG. 1A, when the video signal is displayed by performing a time compression, the video signal of 4:3 can be reproduced on the screen of 16:9. However, the video signal is insufficient and an empty space is produced on the right and left portions of the screen during a horizontal scanning period.

In FIG. 1B, when the NTSC broadcasting signal of 4:3 is displayed on the screen of 16:9 without performing time compression, the picture broadens by 4/3 times in the right and left directions of the screen to make a viewer feel that the picture is being lost.

Also, when displaying the NTSC broadcasting signal of 4:3 aspect ratio in a cinema mode, a deflection treatment expands the picture upward and downward to cut the upper and lower portions as shown in FIG. 1C.

SUMMARY OF THE INVENTION

The present invention is contrived to solve the above-described problems. Accordingly, it is an object of the present invention to provide a method for performing a time compression treatment upon a video signal in a center portion within an effective horizontal scanning section of an existing standard video signal to be presented on a wide screen, and presenting a video signal on the left and right sides of the center portion of the effective horizontal scanning section without performing time compression to broaden the video signal over the wide screen, thereby reducing the empty space of the right and left areas on the wide screen.

It is another object of the present invention to provide an apparatus for performing the above-described method.

To achieve the above object of the present invention, there is provided a method for reducing empty portions of a video signal displayed on a wide screen by decreasing a video blank area appearing on the left and right sides of the wide screen when displaying a second video signal generated from a first video signal having an aspect ratio smaller than that of the wide screen. Here, the method includes the steps of generating a write clock signal, a first read clock signal and a second read clock signal having a frequency higher than that of the first read clock signal, storing the first video signal in response to the write clock signal, and reading out the stored video signal by means of the first and second read clock signals for compressing the video signal occupying the center portion of an effective horizontal scanning section of the first video signal.

To achieve another object of the present invention, there is provided an apparatus for reducing empty portions of a video signal displayed on a wide screen by decreasing a video blank area appearing on the left and right sides of the wide screen when presenting a second video signal generated from a first video signal having an aspect ratio smaller than that of the wide screen. The apparatus includes a memory that stores the first video signal in response to a write clock signal, and outputs the stored first video signal in accordance with a first read clock signal and a second read clock signal, and a selecting portion that selectively outputs a side blank signal preset to a predetermined level and the second video signal from the memory in response to a selection signal. Also, a controlling portion generates the write clock signal, the first read clock signal to compress the video signal occupying the central region of an effective horizontal scanning section of the first video signal, and the second read clock signal having a frequency higher than that of the first read clock signal, and generates the selection signal to select the video signal from the memory when the second video signal is supplied from the memory to the selecting portion and select the side blank signal when the second video signal is not supplied from the memory.

Preferably, a side blank signal having a predetermined value is presented in the left and right areas where a picture is not displayed on the wide screen due to the compression treatment of the typical standard video signal.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 2A:
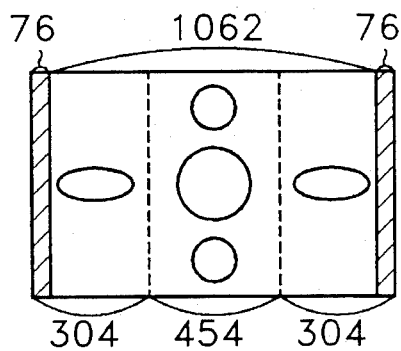
FIGS. 2A and 2B illustrate states of a screen for explaining a compression mode for reducing empty sides of a wide screen television receiver according to the present invention.
Figure 2B:
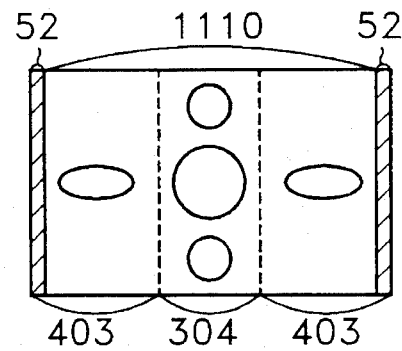

FIGS. 2A and 2B illustrate states of a screen for explaining a compression method in the ratia of 4:3 suggested by the present invention in relation to a wide screen capable of presenting the compression method in 1214 horizontal pixels.

A second compression mode suggested in the present invention will be described with reference to FIGS. 1A and 2A. In view of the second compression mode, an area for displaying the picture is longitudinally divided into four to compress video information corresponding to a ½ size area occupying the center of the picture in the ratio of 4:3. The video information corresponding to ¼ size areas of the left and right portions of the ½ size area is not subjected to compression. Additionally, a region of the wide screen which is not included in the above-stated picture area is to present a side blank signal. In this case, when a horizontal scanning period 1H is divided into 1214 time sections, as shown in FIG. 2A, a broadened picture is shown in periods of: $76 \leq t \leq 379$ and $834 \leq t \leq 1137$, and a picture compressed by 4:3 is shown in a period of $380 \leq t \leq 833$. Therefore, in this compression mode, the right and left empty space caused by the picture presented on the screen can be decreased by as much as ⅛.

A third compression mode according to the present invention will be described with reference to FIGS. 1A and 2B. Here, the area for displaying the picture is longitudinally divided into three, in which video information corresponding to a ⅓ size area occupying the center of the picture is compressed in the ratio of 4:3, and that corresponding to ⅓ size areas of the left and right portions of the above ⅓ area is not compressed. A region of the wide screen which is not included in the above-stated picture area provides a side blank signal. In this case, when the horizontal scanning period 1H is divided into 1214 time sections, a broadened picture is shown in periods of: $52 \leq t \leq 455$ and $759 \leq t \leq 1161$, and a picture compressed by 4:3 is shown in a period of $456 \leq t \leq 758$. Therefore, in the third compression mode, the right and left empty space caused by the presented picture can be reduced by as much as 1/12.

Figure 1A:
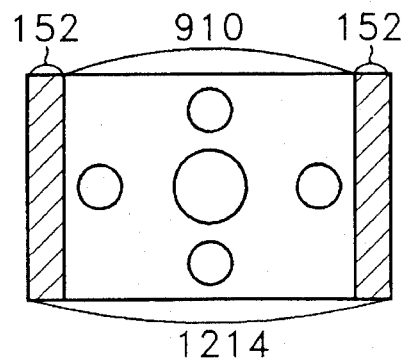
FIGS. 1A to 1C illustrate states of a screen for explaining a compression mode of a conventional wide screen television receiver.

In one embodiment of the present invention explained with reference to FIG. 3, a first compression mode for presenting the picture as shown in FIG. 1A is used as well as the second and third compression modes. The first compression mode employs the 4:3 compression mode to process video information having the aspect ratio of 4:3, thereby illustrating the picture as shown in FIG. 1A. In this case, when the horizontal scanning period 1H is divided into 1214 time sections, the picture is presented only in a period that $152 \leq t \leq 1061$. In other periods, i.e., in the ¼ area occupying the left and right portions of the wide screen, the side blank signal is displayed.

Figure 3:
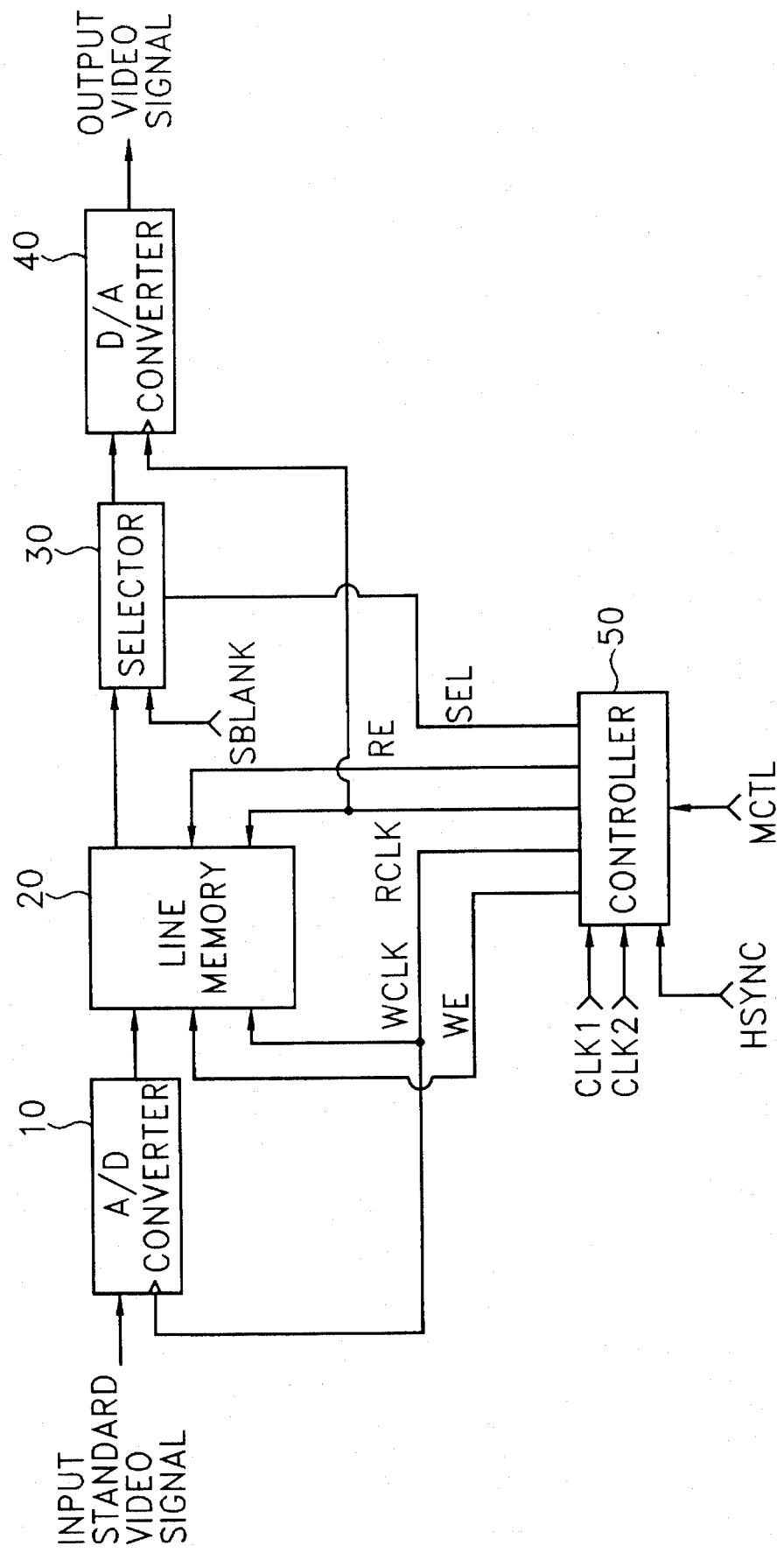
FIG. 3 is a block diagram illustrating an empty side reducing apparatus for reducing horizontal empty space of the wide screen television receiver according to the present invention.

FIG. 3 shows an apparatus for reducing the empty sides of the wide screen television receiver according to the present invention. Here, a controller 50 receives a horizontal sync signal Hsync, a mode control signal MCTL and clock signals CLK1 and CLK2, having different frequencies from unshown external portions to generate a write clock signal WCLK, a read clock signal RCLK, a read enable signal RE, a selection signal SEL, etc., of a proper frequency in accordance with the mode control signal MCTL. An analog-to-digital (A/D) converter 10 for converting the video signal into digital data receives the write clock signal WCLK of the controller 50 as a sampling clock. A line memory 20 stores data from the A/D converter 10, and receives a write enable signal WE, the write clock signal WCLK, read enable signal RE and read clock signal RCLK from the controller 50. A selector 30 connected to the output of the line memory 20 is supplied with a side blank signal SBLANK preset to a predetermined level and the selection signal SEL from the controller 50. A digital-to-analog (D/A) converter 40 is connected to a signal output of the selector 30, and receives the read clock signal RCLK from the controller 50. The read clock signal RCLK is utilized for signal conversion by the D/A converter 40.

Upon the receipt of the standard NTSC video signal having the aspect ratio of 4:3 to the wide screen television receiver, the standard video signal is supplied to the apparatus shown in FIG. 3 provided in the wide screen television receiver. The A/D converter 10 converts the standard video signal to 8-bit digital data in accordance with the write clock signal WCLK to supply the digital data to the line memory 20. The write clock signal WCLK has a frequency of 4fsc ($\cong$14.3 MHz). When the video signal is digitized by being synchronized with the write clock signal WCLK, the number of samples held in the picture actually presented in the wide screen is 910 for the single horizontal scanning period 1H.

The line memory 20 is operated by the write enable signal WE fixed in a low potential state and the write clock signal WCLK of the 4fsc (where fsc is a sub-carrier frequency) supplied from the controller 50 to store the 8-bit data from the A/D converter 10. The data stored in the line memory 20 is read out in accordance with the read enable signal RE and read clock signal RCLK form the controller 50.

Figure 1B:
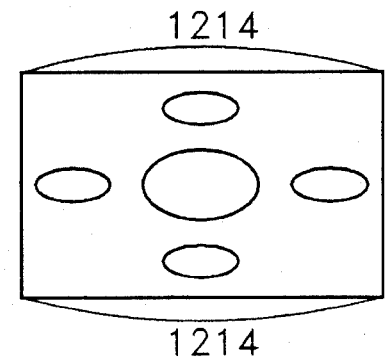
Figure 1C:
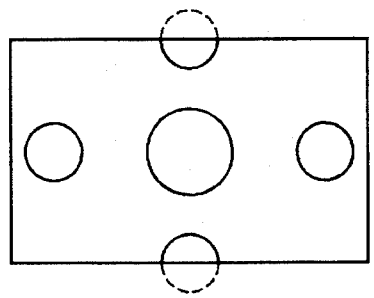

The controller 50 generates the read enable signal RE, read clock signal RCLK and selection signal SEL, which are different in respect to the compression modes described with reference to FIGS. 1, 2A and 2B. The generation of the read enable signal RE, read clock signal RCLK and selection signal SEL by the controller 50 will be described with reference to FIGS. 4 and 5A to 5D as below.

The video data stored in the line memory 20 is subjected to compression to be displayed on the wide screen having the aspect ratio of 16:9 by means of the read enable signal RE and read clock signal RCLK respectively corresponding to compression modes. Once receiving the compressed video data, the selector 30 selectively supplies the side blank signal SBLANK and the output data of the line memory 20 to the D/A converter 40 in accordance with the selection signal SEL from the controller 50. At this time, the side blank signal SBLANK is a signal preset to a predetermined level for allowing the screen to be shown in black. The D/A converter 40 carries out the digital-to-analog conversion of the data from the selector 30 by using the read clock signal RCLK from the controller 50. The read clock signal RCLK used for converting the video data in the D/A converter 40 has the same frequency as the read clock signal RCLK which has been used for reading out the currently digital-to-analog converted data from the line memory 20.

Figure 4:
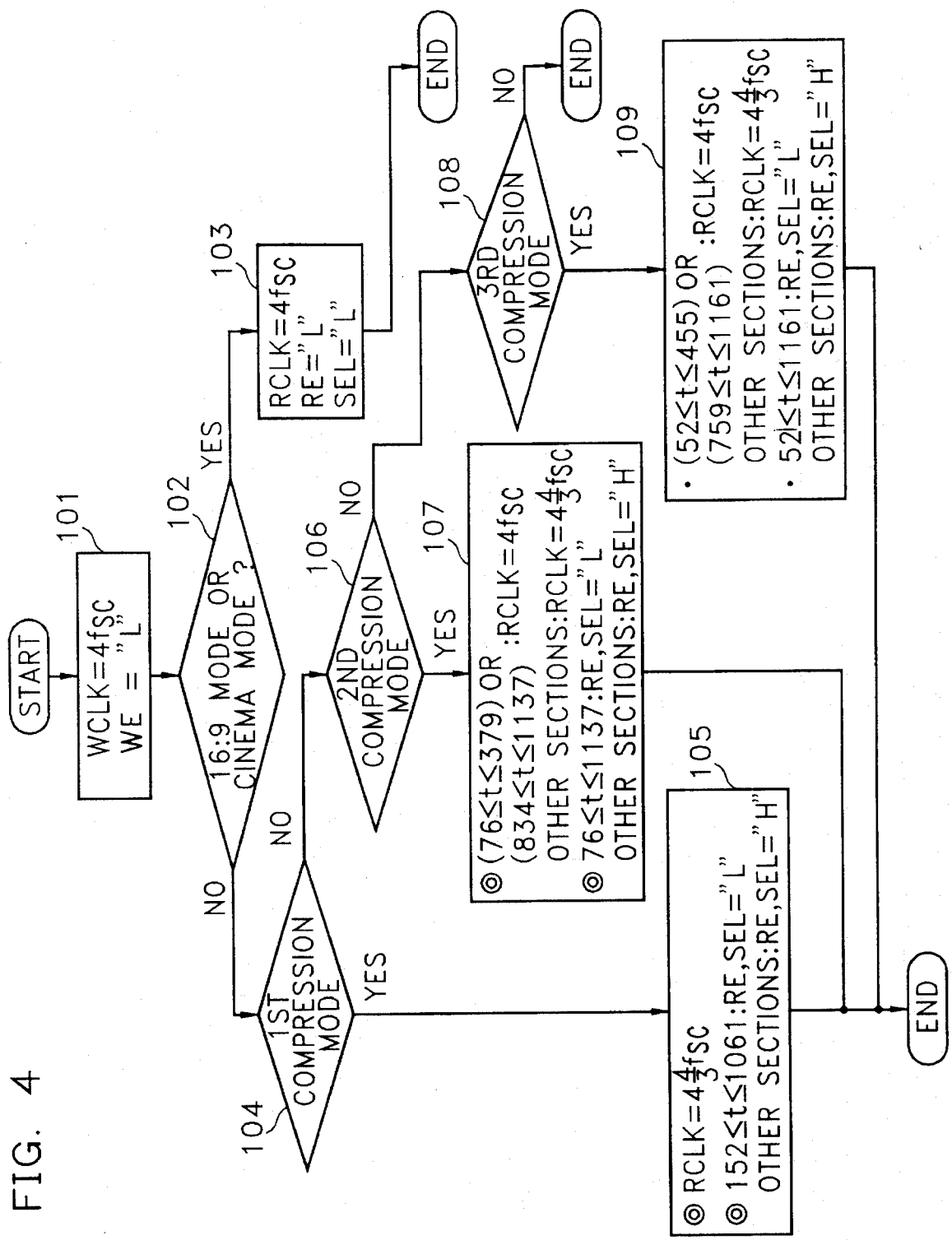
FIG. 4 is a flowchart for illustrating the signal processing executed in a controller.

FIG. 4 shows a flowchart for illustrating the method for reducing the empty sides of the wide screen according to the present invention which is executed in the controller 50 in FIG. 3, and FIGS. 5A to 5D are waveforms of the read enable signal and selection signal for each compression mode.

Hereinbelow, control signal generating steps that are performed by the controller 50 to compress the standard NTSC video signal to be presented on the video screen will be described.

Figure 5A:
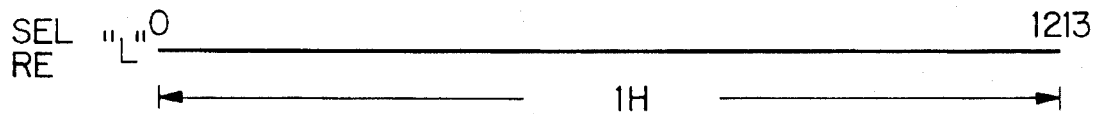
FIGS. 5A to 5D are waveforms of a read enable signal and a selection signal for each compression mode.

The controller 50 sets the frequency of the write clock signal WCLK supplied to the line memory 20 to 4fsc, and outputs the write enable signal WE in the low potential state, thereby setting the line memory 20 to be in a writable state (step 101). Then, the externally supplied mode control signal MCTL is checked to determine whether the mode information is of the 16:9 mode (refer to FIG. 1B) or cinema mode (refer to FIG. 1C) which does not require time compression (step 102). When the mode information is determined to be 16:9 mode or cinema mode, the controller 50 sets the frequency of the read clock signal RCLK supplied to the line memory 20 to 4fsc, and supplies the read enable signal RE to the line memory 20 and the selection signal SEL to the selector 30 in the low potential state for one horizontal scanning period 1H, as shown in FIG. 5A (step 103). Consequently, the selector 30 provides only the video data that was not subjected to time compression from the line memory 20 to the D/A converter 40 in accordance with the selection signal SEL. The side blank signal SBLANK is not supplied to the D/A converter 40.

Figure 5B:
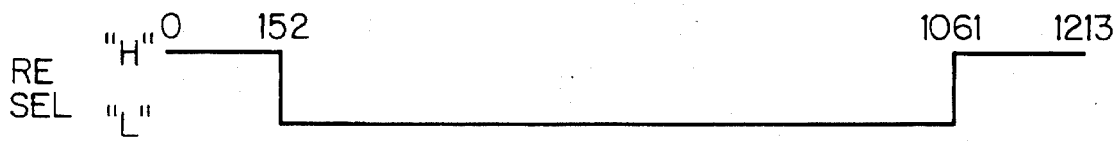

In step 102, if the mode information is not of the 16:9 mode or cinema mode, the controller 50 determines whether it is the first compression mode for presenting the video information as shown in FIG. 1A (step 104) to supply the read clock signal RCLK having the frequency of 4(4/3)fsc to the line memory 20 and D/A converter 40 in case of the first compression mode. Also, the controller 50 generates the read enable signal RE and selection signal SEL which, as shown in FIG. 5B, has low potential only in the section that $152 \leq t \leq 1061$, and high potential in other sections (step 105). In order to time-compress a plurality of sample data on the line memory 20 stored by means of the write clock signal WCLK having the frequency of 4fsc in the ratio of 4:3, the read clock signal RCLK of (4/3)×4fsc is required, where 4fsc=910fh and 4(4/3)fsc=1214fh. By this first compression mode, the viewer can watch the picture as shown in FIG. 1A through the wide screen having the aspect ratio of 16:9.

Figure 5C:
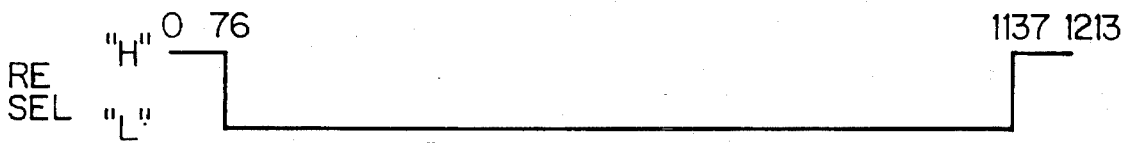

In step 104, if the mode information is not of the first compression mode, the controller 50 determines whether it is the second compression mode as shown in FIG. 2A (step 106) to set the frequency of the read clock signal RCLK to 4 fsc in the section that $76 \leq t \leq 379$ or $834 \leq t \leq 1137$, and 4(4/3)fsc in other sections. At the same time, the controller 50 outputs the read enable signal RE supplied to the line memory 20 and the selection signal SEL supplied to the selector 30 in the low potential state in the section that $76 \leq t \leq 1137$ as shown in FIG. 5C, and in the high potential state in other sections (step 107). By this second compression mode, the viewer can watch the picture as shown in FIG. 2A through the wide screen having the aspect ratio of 16:9.

Figure 5D:
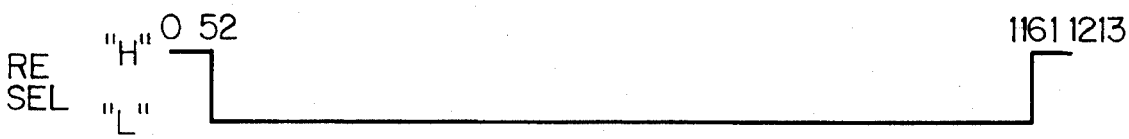

In step 106, if the mode information is not of the second compression mode, the controller 50 determines whether it is the third compression mode (step 108) to set the frequency of the read clock signal RCLK to 4fsc in a section that $52 \leq t \leq 455$ or $759 \leq t \leq 1161$, and 4(4/3)fsc in other sections. At the same time, the read enable signal RE supplied to the line memory 20 and the selection signal SEL supplied to the selector 30 are output in the low potential state only in the section that $52 \leq t \leq 1161$ as shown in FIG. 5D, and in the high potential in other sections (step 109). By this third compression mode, the viewer can watch the picture as shown in FIG. 2B.

The write clock signal WCLK and read clock signal RCLK supplied from the controller 50 to the line memory 20 for each mode is arranged as shown in the following table.

| MODE | WCLK | RCLK |
| --- | --- | --- |
| 16:9 or Cinema Mode | 4fsc | 4fsc |
| First Compression Mode | 4fsc | 4 (4/3)fsc |
| Second Compression Mode | 4fsc | $(76 \leq t \leq 379) \lor (834 \leq t \leq 1137)$: RCLK=4fsc<br>Other sections: RCLK=4·(4/3)fsc |
| Third Compression Mode | 4fsc | $(52 \leq t \leq 455) \lor (759 \leq t \leq 1162)$: RCLK=4fsc<br>Other sections: RCLK=4·(4/3)fsc |

In the method for reducing empty sides of a wide screen and an apparatus thereof according to the present invention as described above, a video signal to be presented on the center of the wide screen is subjected to a time compression process, and a video signal to be presented on right and left sides of the wide screen is not subjected to time compression, so that the empty space appearing on right and left peripheral portions of the wide screen can be reduced. Even though the picture around the right and left peripheral portions of the wide screen is broader, a viewer roughly watches the center of the screen to permit the present invention to be effective.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. An apparatus for decreasing a video blank area appearing on left and right sides of a wide screen when displaying a second video signal generated from a first video signal having an aspect ratio smaller than that of said wide screen, said apparatus comprising:

a memory for storing said first video signal in response to a write clock signal, and for outputting said first video signal in accordance with a first read clock signal and a second read clock signal as said second video signal;

a selecting portion for selectively supplying a side blank signal preset to a predetermined level and said second video signal from said memory in response to a selection signal; and a controlling portion for generating said write clock signal, said first read clock signal, and said second read clock signal to compress a central region of an effective horizontal scanning section of said first video signal, said second read clock signal having a frequency higher than that of said first read clock signal, and for generating said selection signal to select said second video signal from said memory when said second video signal is supplied from said memory to said selecting portion and to select said side blank signal when said second video signal is not supplied from said memory.

2. The apparatus as claimed in claim 1, wherein, by dividing said effective horizontal scanning section of said first video signal into three sub-sections, said controlling portion generates said first read clock signal during a left sub-section within said effective horizontal scanning section, said second read clock signal during a central sub-section, and said first read clock signal during a right sub-section.

3. The apparatus as claimed in claim 2, wherein said controlling portion varies a width of said three sub-sections for generating said first read clock signal and said second read clock signal in accordance with an externally provided compression mode control signal.

4. The apparatus as claimed in claim 3, wherein a frequency of said write clock signal and said first read clock signal generated by said controlling portion are equal.

5. The apparatus as claimed in claim 4, wherein said second read clock signal has a frequency greater than that of said first read clock signal by 4/3 times thereof when a standard NTSC signal is supplied to said wide screen having 1214 number of samples for one effective horizontal scanning period.

6. A method for decreasing a video blank area appearing on left and right sides of a wide screen when displaying a second video signal generated from a first video signal having an aspect ratio smaller than that of said wide screen, said method comprising the steps of:

generating a write clock signal, a first read clock signal and a second read clock signal having a frequency higher than that of said first read clock signal;

storing said first video signal in response to said write clock signal; and reading out said stored first video signal by means of said first read clock signal and said second read clock signal for compressing said stored first video signal occupying a center region of an effective horizontal scanning section of said stored first video signal.

7. The method as claimed in claim 6, wherein said generating step comprises the steps of:

dividing said effective horizontal scanning section into three sub-sections;

generating said first read clock signal during a left-subsection within said effective horizontal scanning section;

generating said second read clock signal during a central sub-section within said effective horizontal scanning section; and generating said first read clock signal during a right sub-section within said effective horizontal scanning section.

8. The method as claimed in claim 7, wherein a width of said three sub-sections for generating said first read clock signal and said second read clock signal is variable.

9. The method as claimed in claim 8, wherein said write clock signal and said first read clock signal generated in said generating step have the same frequency.

10. The method as claimed in claim 9, wherein said second read clock signal has a frequency greater than that of said first read clock signal by 4/3 times thereof when a standard NTSC signal is supplied to said wide screen having 1214 number of samples for one effective horizontal scanning section.

11. The apparatus as claimed in claim 3, wherein said left sub-section corresponds to an area which is 1/4 an entire area of said first video signal, said right sub-section corresponds to an area which is 1/4 said entire area of said first video signal, and said central sub-section corresponds to an area which is 1/2 said entire area of said first video signal when said compression mode control signal indicates a first compression mode.

12. The apparatus as claimed in claim 3, wherein said left sub-section corresponds to an area which is 1/3 an entire area of said first video signal, said right sub-section corresponds to an area which is 1/3 said entire area of said first video signal, and said central sub-section corresponds to an area which is 1/3 said entire area of said first video signal when said compression mode control signal indicates a second compression mode.

13. The apparatus as claimed in claim 11, wherein said left sub-section corresponds to an area which is 1/3 said entire area of said first video signal, said right sub-section corresponds to an area which is 1/3 said entire area of said first video signal, and said central sub-section corresponds to an area which is 1/3 said entire area of said first video signal when said compression mode control signal indicates a second compression mode.

14. The apparatus as claimed in claim 8, wherein said left sub-section corresponds to an area which is 1/4 an entire area of said first video signal, said right sub-section corresponds to an area which is 1/4 said entire area of said first video signal, and said central sub-section corresponds to an area which is 1/2 said entire area of said first video signal during a first compression mode.

15. The apparatus as claimed in claim 8, wherein said left sub-section corresponds to an area which is 1/3 an entire area of said first video signal, said right sub-section corresponds to an area which is 1/3 said entire area of said first video signal, and said central sub-section corresponds to an area which is 1/3 said entire area of said first video signal during a second compression mode.

16. The apparatus as claimed in claim 14, wherein said left sub-section corresponds to an area which is 1/3 said entire area of said first video signal, said right sub-section corresponds to an area which is 1/3 said entire area of said first video signal, and said central sub-section corresponds to an area which is 1/3 said entire area of said first video signal during a second compression mode.

* * * * *